May 1, 1951     R. KAMMERAAD     2,551,010
TAIL GATE CONSTRUCTION FOR STATION WAGONS
Filed March 29, 1947     2 Sheets-Sheet 1
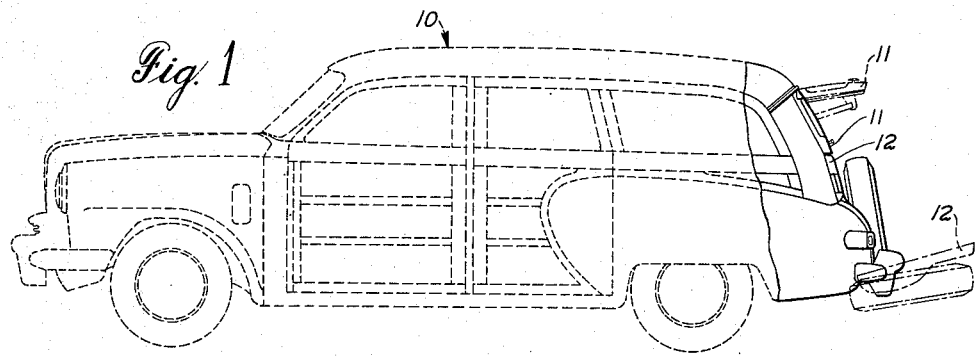
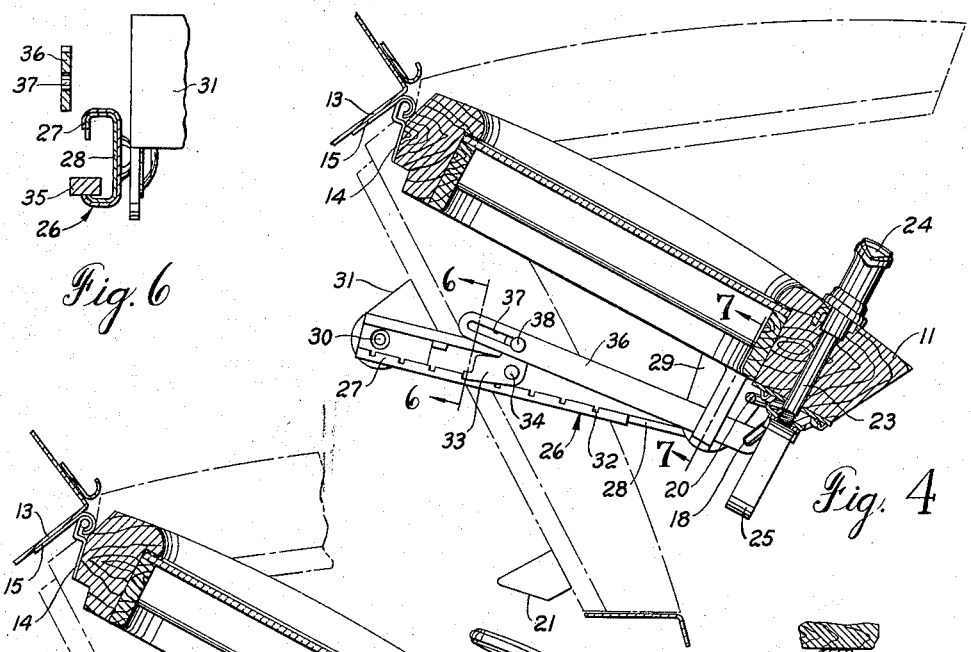
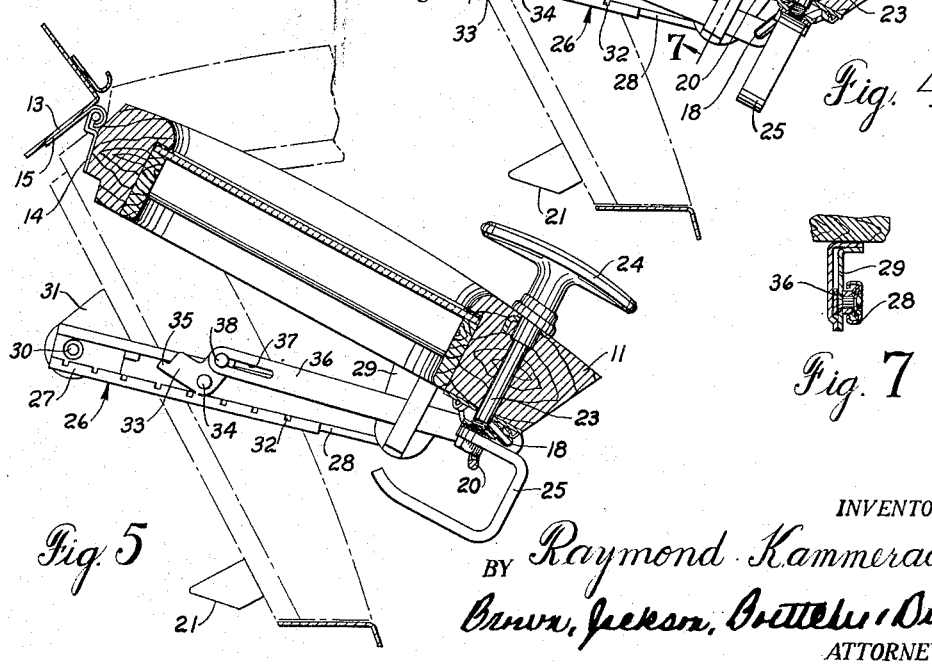
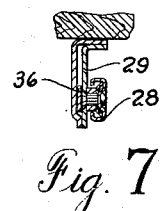
INVENTOR.
Raymond Kammeraad
ATTORNEYS.

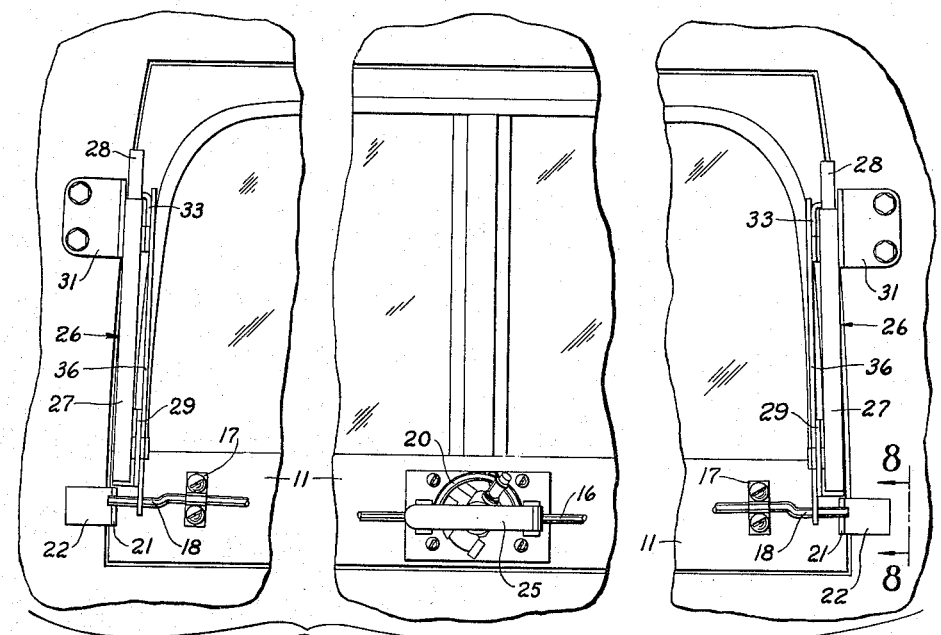
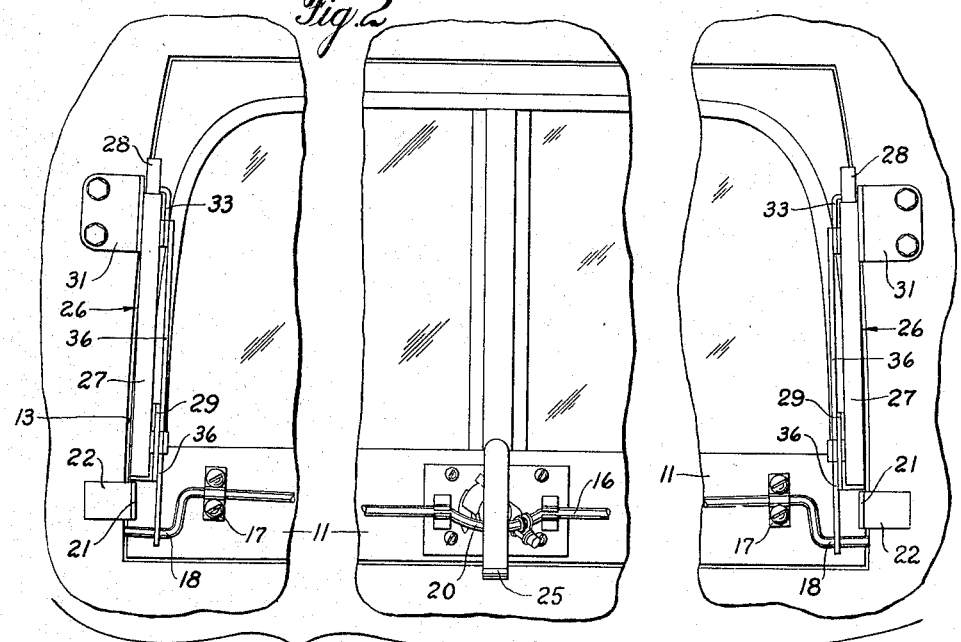
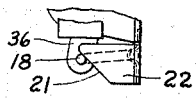
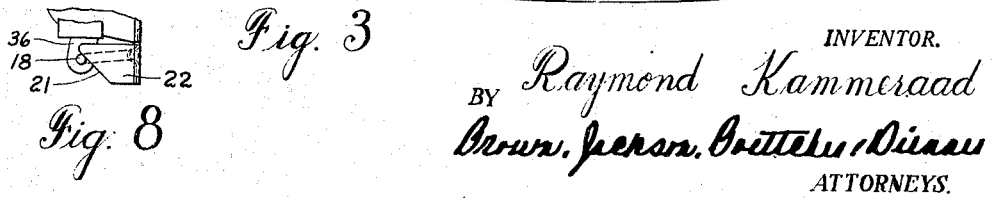

Patented May 1, 1951

2,551,010

UNITED STATES PATENT OFFICE 2,551,010

TAIL GATE CONSTRUCTION FOR STATION WAGONS

Raymond Kammeraad, South Bend, Ind., assignor to The Studebaker Corporation, South Bend, Ind., a corporation of Delaware Application March 29, 1947, Serial No. 738,069

4 Claims. (Cl. 292—267)

The present invention relates to combined means for securing a door in the closed position and releasing it therefrom, and for holding the door in any one of a plurality of positions between its fully opened and fully closed position. The invention will be specifically illustrated and described in connection with the upper tail gate of an automobile station wagon in connection with which it is particularly advantageous.

The object of the invention, generally stated, is the provision of a combined door locking and adjusting means having a single operating handle shaft which serves to lock and open the door in and from its closed position, as well as adjust it in a plurality of intermediate positions between its closed and fully open positions.

More specific objects of the invention will, in part, be obvious and will, in part, appear hereinafter.

For a more complete understanding of the nature and scope of the invention, reference may now be had to the following detailed description thereof, taken in connection with the accompanying drawings, wherein:

Figure 1 is a phantom view of an automobile station wagon with the rear end thereof shown in solid line, the upper and lower tail gates being shown in broken line in their opened positions;

Figure 2 is an elevational view of the inside of the upper tail gate and associated door frame when locked in the closed position;

Figure 3 is a view similar to Figure 2 with the upper tail gate unlocked and ready for opening;

Figure 4 is a vertical cross-sectional view, partly in elevation, taken through the center of the upper tail gate and showing the gate section locked in one of the intermediate positions, with the fully closed and fully opened positions indicated in broken line;

Figure 5 is a view similar to Figure 4, but showing the adjusting mechanism turned to the unlocked or opened position whereby the upper tail gate may be freely moved either up or down;

Figure 6 is a sectional view taken on line 6—6 of Figure 4;

Figure 7 is a fragmentary sectional view taken on line 7—7 of Figure 4; and

Figure 8 is a fragmentary elevational view taken on line 8—8 of Figure 2.

Referring to Figure 1 of the drawings, a station wagon is indicated generally at 10, the back end of which is provided with upper and lower tail gates 11 and 12, respectively. The present invention is concerned with combination means for locking the upper tail gate 11 in the closed position, as well as for adjusting it in any desired open position.

When the tail gate of the station wagon 10 is fully opened, the upper gate 11 will be raised to the fully open position, as shown in broken line, while the lower gate 12 will be downwardly turned to its lowered position, as shown in broken line. When thus raised, extension means are required for holding the upper tail gate 11 in such position so as to prevent it from falling shut. Furthermore, when the lower tail gate 12 is closed, there is frequent need to open the upper tail gate 11 for purposes of ventilation. For this purpose, adjustable support means are needed, so that the gate 11 may be secured in a plurality of positions intermediate the closed and fully raised, depending upon the amount of ventilation required.

As shown in Figures 4 and 5, the door or tail gate 11 is hinged adjacent its upper edge to the top of the door frame 13. One section 14 of the hinge is secured to the upper part of the gate 11, while another section 15 of the hinge is secured to the inside of frame 13. Hinge section 14 has a knuckle section which fits within a corresponding portion of the hinge section 15, so as to turn therewithin, allowing the tail gate 11 to be opened and closed from the bottom.

Referring particularly to Figures 2 and 3, the reference character 16 designates a rock shaft which is supported on the inside of the tail gate section 11 along the lower edge thereof by means of the two clamps 17, 17 allowing the rock shaft 16 to rock or turn therein. At its opposite ends, the rock shaft 16 has crank arms 18. At the middle, the rock shaft 16 is provided with an arcuate crank portion 20. It will be noted that the crank arms 18 lie in a plane which intersects the plane of the arcuate crank portion 20 at approximately right angles, although it will be understood that this exact relationship is not important. However, the two planes should preferably intersect at a substantial angle with each other.

When the arcuate crank portion 20 is turned up flat against the door or gate section 11 (as shown in Figures 2 and 4) the crank arms 18 will be turned out away from the tail gate section 11, so as to engage the biased engaging edges 21 of a pair of catches 22, as shown in Figures 2 and 8. The catches 22 are secured to the vertical sides of the door frame 13 adjacent the opposite lower corners of the tail gate 11. By this arrangement, the tail gate 11 is securely held in its closed position in the frame 13.

When the arcuate crank portion 20 of the rock shaft 16 is turned down away from the inside of the door, as indicated in Figures 3 and 5, the crank arms 18 at the opposite ends thereof will be turned down and inwardly against the opposite corners of the door, as shown. The crank arms 18 are thus moved out of engagement with the catches 22, thereby allowing the tail gate section to be outwardly opened.

The mechanism for turning the rock shaft 16 is as follows: A handle shaft 23 extends through the tail gate section 11, as shown in Figures 4 and 5. At its opposite ends the shaft 23 is provided with an outside handle 24 and an inside handle 25. Suitable linkage is interconnected between the handle shaft 23 and the arcuate crank portion 20 whereby when the handles 24 and 25 are turned to one position, as shown in Figures 2 and 4, the arcuate crank portion 20 will be turned up against the inside of the tail gate 11, while when the handles are turned approximately 90°, the arcuate crank portion 20 will be turned out away from the tail gate 11. The linkage connection may be that shown in Patent 2,000,245 granted May 7, 1935.

In addition to the foregoing arrangement for releasably locking and unlocking the upper tail gate 11 in the closed position, the present invention also incorporates adjustable support means whereby the gate 11 may be adjustably positioned between the fully closed and the fully opened positions.

At the opposite sides of the tail gate 11, telescopic links, indicated generally at 26, are provided which serve to interconnect the vertical sides of the door frame 13 with the adjacent sides of the tail gate 11. The telescopic links 26 comprise interfitting C-shaped members 27 and 28, respectively. The free end of the outer telescopic section 27 of each link 26 is stationarily pivoted at 30 to a bracket 31 secured to the adjacent side of the door frame 13. The free end of the inner telescopic section 28 of each link 26 is pivotally connected to a bracket 29 attached to the adjacent lower corner of the gate 11, as shown in Figures 4 and 5. Thus, the outer section 27 of each link 26 is stationarily pivoted adjacent the side of the door frame, while the associated inner section 28 is free to slide in and out.

In order to adjust the length of the telescopic links 26 in a plurality of positions between the fully closed and the fully extended positions thereof, stop means are provided on each link 26 so as to be actuated from the rocker shaft 16. Referring particularly to Figures 4, 5 and 6, it will be seen that the lower flange of the outer telescopic section 27 of each link 26 is provided with a series of notches 32. A bell crank 33 is pivotally connected to the inner telescopic section 28 by a rivet 34. The bell crank 33 has a notch engaging projection 35 (Figure 6) on one arm thereof adapted to engage in the notches 32, thereby preventing relative movement between the sections 27 and 28.

The bell crank 33 of each link 26 is actuated by a connecting link 36 provided with a slot 37 at one end which fits over a headed rivet 38 through the upper arm of the bell crank 33, and pivotally connected at its opposite end to the adjacent crank arm 18.

The slot 37 in each connecting link 36 allows lost motion between the rock shaft 16 and the bell crank 33. By this arrangement, when the bell crank 33 is in the position shown in Figure 4 with the notch engaging projection 35 engaging in one of the notches 32, initial rotation of either handle 24 or handle 25 will not actuate the bell crank 33 until the handles have been turned part way to the open position, as shown in Figures 3 and 5. Likewise, when the bell crank 33 is in the open position, as shown in Figure 5, initial movement of the handles 24 or 25 will not actuate the bell crank 33 until the handles have been partly turned to the closed position.

In operation, the door closing and adjusting combination operates as follows: Assuming that the upper tail gate 11 is in the closed position and that it is desired to open it part way, either the handle 24 or the handle 25 is turned to the position shown in Figure 5, thereby releasing the crank ends 18 from the catches 22 and at the same time turning the notch engaging projections 35 to their non-engaging position. Now by pulling or pushing on the handle, depending upon which one is being grasped, the door or gate section 11 can be lifted up to any desired position. When the desired position has been obtained, the handles are turned 90° to the position shown in Figure 4 with the door being raised or lowered slightly to bring each projection 35 into engagement with the next adjacent notch 32.

When it is desired to close the tail gate 11, either of the handles 24 or 25 is turned so as to release each notch engaging projection 35 from the notch 32 in which it is engaged, and the door is then lowered to the closed position and the handle turned so as to lock the crank ends 18 under the catches 22.

Since certain changes may be made in the foregoing construction, and different embodiments of the invention may be made without departing from the scope thereof, it is intended that all matter described hereinabove, or shown in the accompanying drawings, be interpreted as illustrative and not in a limiting sense.

What is claimed as new is:

1. For combination with a door frame, having a door fitting therewithin, and having hinge means connecting one side of said door with the adjacent side of said frame; means for securing said door in its fully closed position and in a plurality of positions between its fully closed and fully opened positions, which comprises in combination, telescopic link means, having a pair of interfitting link members, adapted to be secured on at least one side of said door; other than the side which is hinged, with one end of one interfitting member of said link adapted to be pivoted adjacent one side of said door frame and with the corresponding end of the other interfitting link member adapted to be pivotally connected to the corresponding side of said door; adjustable stop means provided on said telescopic link means whereby the length of said link means may be adjusted in a plurality of positions between its shortened and extended conditions, a fixed catch adapted to be secured on the side of said door frame having said telescopic link means, a crank, one arm of which is adapted to be mounted for rotational movement on said door, with the other arm being free to either move into engagement with said catch so as to lock said door in said fully closed position or to move away from said catch so as to unlock said door; a connecting link between said catch engaging crank arm and said adjustable stop means for operating the latter, a handle adapted to be accessibly positioned on said door, and operating means interconnecting said handle with said first mentioned crank arm mounted on said door, whereby, when said handle is turned to one position, it will move said catch engaging crank arm into locking engagement with said catch and, when turned to another position, it will move said same crank arm out of said locking catch engagement position; and whereby, when said door is moved out of the fully closed position, operation of said handle serves to operate said stop means through said crank.

2. For combination with a door frame, having a door fitting therewithin, and having hinge means connecting the tops of said door and frame whereby said door may be opened by swinging out the bottom thereof; means for securing said door in its fully closed position and in a plurality of positions intermediate its fully closed and fully opened positions, which comprises in combination, a pair of telescopic link means adapted to be secured on opposite sides of said door, with one end of one telescoping member of each link adapted to be stationarily pivoted to the adjacent side of said door frame and with one end of the other telescoping member of each telescopic link adapted to be pivoted to the corresponding side of said door, both of said telescoping members of each telescopic link means having a C-shaped cross-section and adapted for mutual sliding relative movement, one within the other, the lower flange on the outer telescoping member of each telescopic link having a plurality of closely spaced notches formed therein; a bell crank pivoted to the inner telescoping member of each telescopic link means and having a lower arm distinguished by a notch engaging projection adapted to engage said spaced notches of the associated outer telescoping member whereby the length of each telescopic link means may be adjusted in a plurality of positions between its shortened and extended conditions; a pair of fixed catch members, one adapted to be fastened adjacent each lower corner of said door frame; a rock shaft adapted to be carried on one side of said door adjacent the bottom thereof and adapted to be mounted for rotational movement thereon, said rock shaft having crank arms at its opposite ends and an arcuate crank portion in its middle; a handle shaft adapted to extend through said door adjacent said arcuate crank portion, a handle carried on at least one end of said handle shaft, on one side of said door; linkage means interconnecting said handle shaft with said arcuate crank portion whereby rotation of said handle shaft rotates said arcuate crank portion away from or flat against said door, said crank arms being so angularly displaced relative to said arcuate crank portion that, when the latter is turned flat against said door, said adjoined crank arms will engage said fixed catches so as to secure said door in a tightly closed position, and said crank arms will disengage from said catches when said arcuate crank portion is turned away from said door; and a pair of connecting link members each pivoted at one end to one of said crank arms and at the other end to an upper arm of one of said bell cranks, whereby, when said crank arms are moved to said catch engaging position, said bell cranks will cause said associated notch engaging projections to engage adjacent notches, and whereby, when said crank arms are removed from said catch engaging position, said bell cranks will remove said projections from their notch engaging positions.

3. The structure called for in claim 2 wherein each of said connecting link members has a slot and pin connection with the upper arm of the associated bell crank so as to provide lost motion between these interconnected parts of the combination.

4. The structure recited in claim 1, in which the adjustable stop means is characterized by a plurality of spaced notches formed along the length of one of said telescopic link members, and a bell crank pivotally mounted on said other interfitting link member, one arm of said bell crank being distinguished by a notch engaging projection thereon, whereby, upon the turning of said handle in one direction, said projection will be moved into engagement with an adjacent notch; and upon turning said handle in an opposite direction said projection will be removed from said previously engaged notch.

RAYMOND KAMMERAAD.

REFERENCES CITED

The following references are of record in the file of this patent:

UNITED STATES PATENTS

| Number | Name | Date |
|---|---|---|
| 411,557 | Scarborough | Sept. 24, 1889 |
| 1,955,435 | Moore | Apr. 17, 1934 |
| 2,059,692 | Griswold | Nov. 3, 1936 |
| 2,203,876 | Peterson | June 11, 1940 |

FOREIGN PATENTS

| Number | Country | Date |
|---|---|---|
| 17,224 | Switzerland | Dec. 28, 1898 |